July 17, 1934.  R. J. WOODS, JR  1,966,778
ROAD GUARD FOR HIGHWAYS
Filed Sept. 5, 1933  3 Sheets-Sheet 1
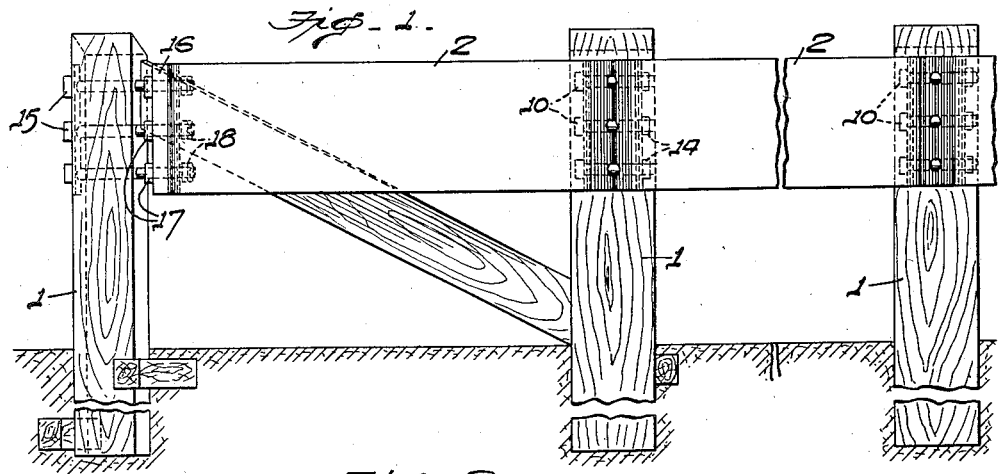
Fig. 1.
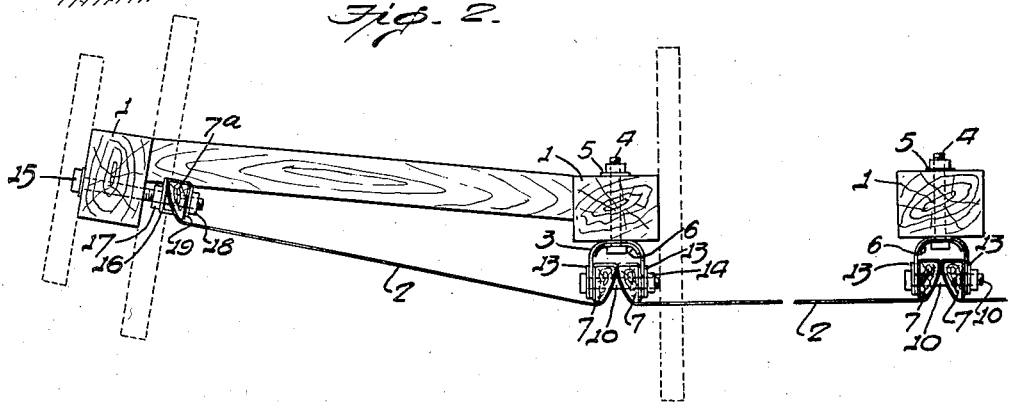
Fig. 2.
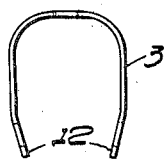
Fig. 5.
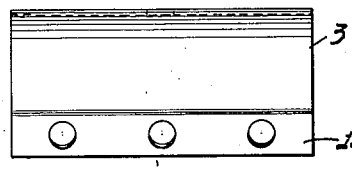
Fig. 4.
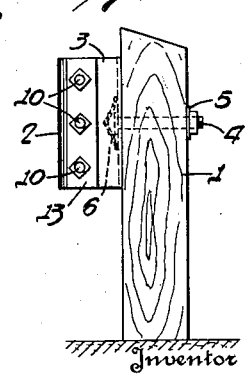
Fig. 3.
Fig. 6.
Fig. 8.
Fig. 9.
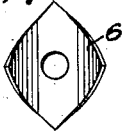
Fig. 7.
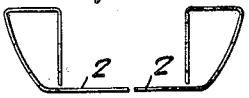
Fig. 10.
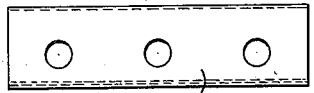
Fig. 10ª.
Fig. 11ª.
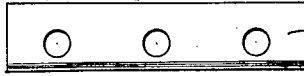
Fig. 11.
Inventor
Robert J. Woods Jr.
By
Attorney

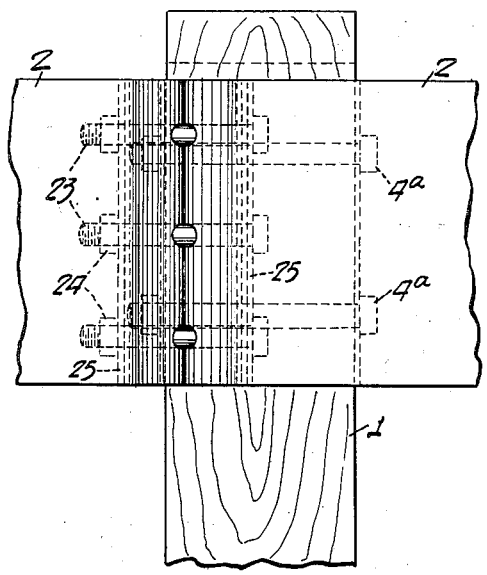
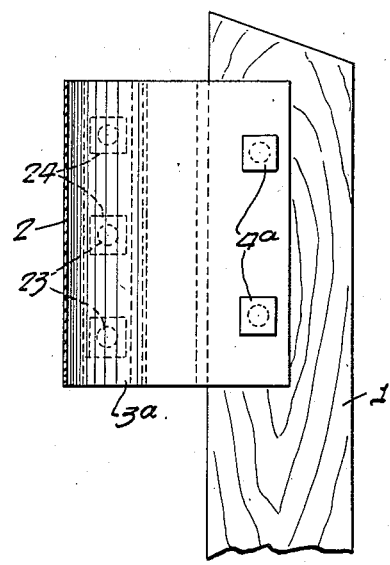
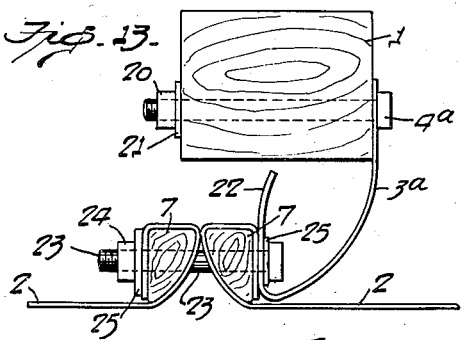
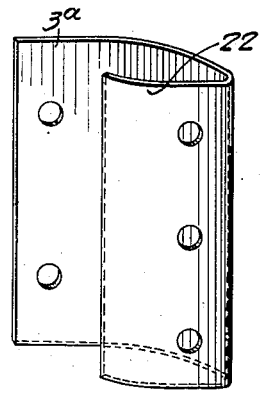
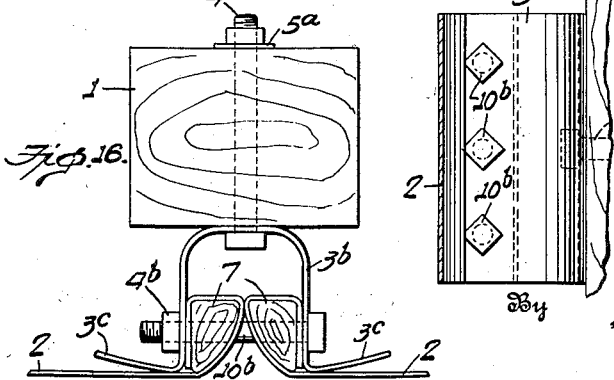

July 17, 1934.  R. J. WOODS, JR  1,966,778
ROAD GUARD FOR HIGHWAYS
Filed Sept. 5, 1933  3 Sheets-Sheet 3

Inventor
Robert J. Woods Jr.
By
Attorney

Patented July 17, 1934

1,966,778

UNITED STATES PATENT OFFICE 1,966,778

ROAD GUARD FOR HIGHWAYS

Robert J. Woods, Jr., Atlanta, Ga.

Application September 5, 1933, Serial No. 688,207

5 Claims. (Cl. 256—13.1)

My invention relates to road guards for highways. It was for its object to provide a road guard with improved means connecting the ends of the rails or panels of the structure with the supporting posts so that the connecting means will better resist the stresses and strains resulting from contact of a traveling motor or vehicle with the rails or panels and afford a safe buffer to the sudden and forcible impact against the rails or panels and in which there will be less likelihood of fracture or damage to the rails or panels by reason of such impact. Also in which the means for connecting the rails or panels to brackets connecting them with the supporting posts will lessen the liability of the rails or panels becoming detached and pulled away from the connecting brackets. Also to provide improved means for coupling together adjacent ends of the rails or panels in the space between adjacent supporting posts; also to lessen the cost of construction and erection of the guard, without weakening or impairing the efficiency of the guard as an entirety as well as in the individual elements or units of the structure. To the accomplishment of the foregoing and such other objects as may hereinafter appear the invention consists in the features hereinafter particularly described and then sought to be clearly defined by the appended claims, reference being had to the accompanying drawings forming a part hereof and in which is illustrated some of the different forms in which the invention may be embodied, and in which:

Figure 1 is a front elevation of a road guard embodying the invention;

Figure 2 is a top plan view of the same;

Figure 3 is a side elevation of a post, with one of the resilient brackets attached;

Figure 4 is a side view of a resilient bracket, detached;

Figure 5 is a top plan view of Figure 4;

Figure 6 is a top plan view of a leaf spring for reinforcement of a resilient bracket;

Figure 7 is a face view of the leaf spring;

Figure 8 is a side view of a filler block;

Figure 9 is an end view of a filler block;

Figure 10 is a top plan view of a panel or guard rail in section;

Figure 18:
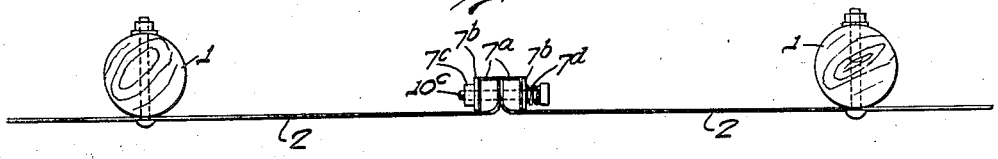
Figure 19:
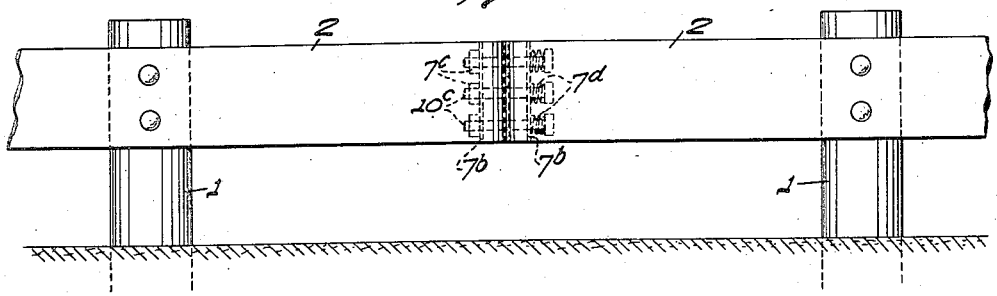
Figure 20:
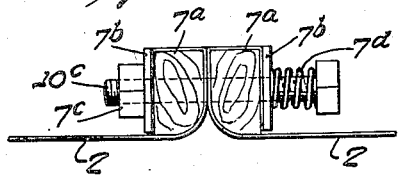
Figure 21:
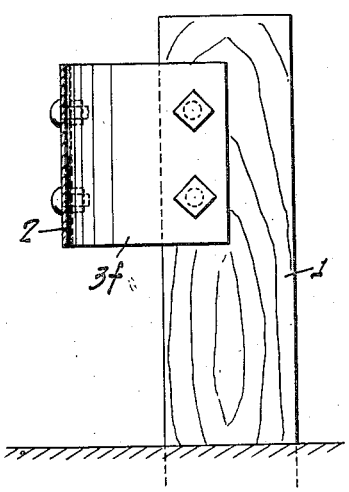
Figure 22:
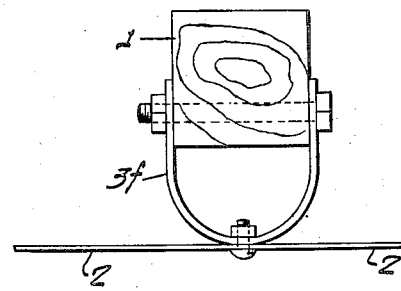

Figure 10ᵃ is an end view of Fig. 10;

Figure 11 is a face view of an angle plate;

Figure 11ᵃ is an end view of Fig. 11;

Figure 12 is a front elevation of a modified form of the invention;

Figure 13 is a top plan view of Fig. 12;

Figure 14 is a side elevation of Fig. 12;

Figure 15 is a perspective view of the bracket shown in Fig. 13;

Figure 16 is a top plan view of an additional modified form of the invention;

Figure 17 is a side elevation of Fig. 16;

Figure 18 is a top plan view of a modified form of the guard rail connection;

Figure 19 is a front elevation of Fig. 18;

Figure 20 is a detail view of the guard rail connection shown in Fig. 18;

Figure 21 is a side elevation of a modified form of spring bracket used in connection with the modified form of guard rail connection shown in Fig. 18;

Figure 22 is a top plan view of Fig. 21.

In the drawings the numeral 1 designates posts of any desired number and of suitable form and material, which will be erected along one or both sides of a highway, for the distance to be protected. Guard rails or panels 2, consisting of strips or panels of suitable material, preferably of resilient steel of suitable tensile strength, extend from one post to another, and are connected with and supported from the posts by brackets 3, formed preferably of metal, for instance, steel of an accepted grade and quality for strength and resiliency. The brackets 3 are formed from sheets or strips of spring steel of a width substantially corresponding to the depth of the sheet metal rails or panels, and bent into U-shape and attached to the posts by bolts 4 passed through the base of the bracket and through the post and secured by nuts applied to the threaded ends of the bolts. A washer 5 is placed between the post and nut of each bolt. A leaf spring 6 is placed inside the bracket against its base and held by the heads of the bolts that secure the brackets to the post. The ends of adjacent rails or panels are wrapped about filler blocks 7 made of wood or metal and they assume the shape of the blocks, each of which has a convex face 8. The blocks are positioned between the wings of the brackets with their convex faces next to each other as illustrated. The convex faces 8 of the blocks present a prolonged tapering, convex bearing surface for the rails or panels, and prevent fracture of the rails or panels when placed under longitudinal tension. The corners 9 of the filler blocks are also preferably rounded so that no sharp angles will be presented to the rails or panels at the points where the greatest strain occurs when the rails are under tension. The filler blocks with the ends of the rails wrapped around them are held in place by bolts 10 passed through openings 11 in the brackets and through the blocks. The ends of the brackets are preferably bent slightly inwardly as shown at 12; and washers 13 placed between the nuts, and also the heads of the bolts and the side walls of the bracket 3, tend to flatten or straighten the bent ends of the bracket when the nuts 14 are tightened, and thus is obtained the function of nut lock washers. The filler blocks need no other means than the bolts which pass through them and the bracket for holding the blocks in position in the brackets. The ends of the resilient rails or panels being wrapped about the filler blocks will prevent the rails from pulling away from the filler blocks and will also reinforce the inwardly turned portions of the rails or panels so that they will not be ruptured by tension exerted on the rails. The filler blocks formed with the convex bearing for the ends of the rails also serve to exert an endwise pull on the rails or panels when the latter are placed under tension, so as to draw one rail towards the other when the nuts on the bolts are tightened, and thus the tension on the rails may be regulated and the rails kept in taut condition.

The guard rails or panels are secured to the end posts of the structure by bolts 15 passing through the post and through a filler block 7$^a$ of the same form as the previously described filler blocks and also through the portion of the sheet metal rail or panel which is wrapped about the filler block as in the other filler blocks described. An angle plate 16 is supported by the bolts 15 so as to provide a flat bearing for nuts 17 threaded onto the bolts between the filler block and the end post so that the nuts will constitute abutments for the angle plate 16, the filler block 7$^a$ and end of the rail or panel when nuts 18 on the ends of bolts 17 are screwed up, to give tension and tautness to the end rail of the guard, which rail may be set obliquely to the line of the roadway as illustrated in Figure 2 of the drawings, so as to deflect a traveling vehicle inwardly towards the road-bed if it strikes a guard-rail or panel at the end of the guard structure. A suitable washer 19 may be applied between nuts 18 of bolts 17 and face of the filler block 7$^a$ and bent end of rail 2.

In Figures 12 to 15 of the drawings is illustrated a modified form of spring bracket by which the rails or panels are connected with and supported from the posts 1. This bracket designated by the numeral 3$^a$, is substantially of the form illustrated, and secured to the post by bolts 4$^a$ passed through the post from side to side and provided with nuts 20 between each of which and the post may be washers 21. The bracket is curved inwardly between the post and guard rail or panel in the direction of traffic travel, indicated by the arrow in Fig. 13, so as to act as a spring buffer to the impact of a traveling vehicle against the guard rail or panel. The free end 22 of the bracket is projected or deflected inwardly towards the post on a curve as illustrated so that if forced into contact with the post under a strong impact additional spring resistance to movement of the rail or panel will be afforded. This form of spring bracket efficiently transfers stress to the post in the direction of traffic so that there is less danger of damage to the post, and it will also serve as a slide to deflect the vehicle away from the post. The inwardly deflected end 22 of this bracket also serves for attachment by bolts 23 of the ends of adjacent rails 2 and the filler blocks 7 with which they are provided. The bolts 23, of which three are represented have nuts 24 applied to their threaded ends, and washers 25.

In Figs. 16 and 17 is shown another modified form of spring bracket for connecting the rails or panels 2 with the supporting post 1. In this form the bracket 3$^b$ is of the U-shaped type and has its free ends 3$^c$ deflected outwardly, obliquely to the longitudinal plane of the rails or panels, and they serve as elastic cushions or buffers to the inward deflection of the rails or panels under impact. The rails or panels have their ends bent inwardly about filler blocks 7 like those previously described, and bolts 10$^b$ pass through the ends of the rails or panels, wrapped about the blocks, and through the filler blocks and provided with nuts. The bracket will be attached to the post 1 by one or more bolts 4$^a$ provided each with a nut and a washer 5$^a$.

Figures 18, 19 and 20 of the drawings illustrate a form in which the rails or panels 2 have their adjacent ends turned inwardly at a point between supporting posts 1, the inturned ends forming pockets to receive filler blocks 7$^a$ of wood, or metal, the metal of each rail or panel being wrapped about the individual filler blocks as in the other forms described. The rails and blocks are drawn together by bolts 10$^c$ passing through openings or holes formed in the pocket portions of the rails or panels, and in the filler blocks and also through plates or washers 7$^b$ bearing against the outer walls of the pockets and through the filler blocks so that when nuts 7$^c$ applied to threaded ends of the bolts are screwed up the rails and filler blocks will be drawn one towards the other and slack in the rails taken up and the rails made taut between the posts. Springs 7$^d$, preferably of helical type, are placed between the bolt heads and adjacent washer plate 7$^b$ so as to keep the rails or panels taut under changes in atmospheric conditions. The rails or panels may be secured to the posts by bolts and nuts as shown in Figs. 18 and 19.

It will be observed that the adjacent faces of the filler blocks have convex surfaces which provide prolonged bearings for the sheet metal rails or panels where they pass between the filler blocks and thus prevent the rails or panels from being fractured at such points when impact is made against the rails or panels. Rails or panels of the type illustrated in Figs. 18 and 19 may be connected with and supported from the posts 1 by U-shaped spring brackets 3$^f$ secured by bolts and nuts to the posts and having the rails or panels connected to the spring brackets by suitable bolts and nuts, as illustrated in Figs. 21 and 22. In this last described form the adjacent ends of the rails or panels may be connected with each other as shown in Figs. 18, 19 and 20, and will be connected to the posts by the spring brackets 3$^f$ as illustrated in Figs. 21 and 22 instead of by bolts passed directly through the rails and posts as in Figs. 18 and 19. The spring bracket of Figs. 21 and 22 holds the rail or panel offset from the posts and gives additional resilient resistance both in the direction of traffic and also towards the post under impacts against the rails or panels.

I have illustrated and described with particularity several different embodiments or modifications of my invention but it will be observed that each illustration contains one or more of the features common to all the forms. It is also obvious that some of the features may be omitted or changed in details without departing from essential features as sought to be clearly defined in the several appended claims.

Having described my invention and set forth its merits what I claim is:

1. A road guard for highways comprising supporting posts, sheet metal rails supported by the posts, resilient brackets connecting the rails to the posts, reinforcing blocks for the ends of the rails, said blocks each having a convex face extending the length of the block and converging towards the opposite face of the block, the rails being shaped about said blocks to form pockets corresponding to the contour of the filler blocks, with the convex faces of the blocks providing prolonged convex bearings for the ends of the rails, between the blocks, and means securing said rails and filler blocks to the bracket.

2. A road guard for highways comprising supporting posts, sheet metal rails supported by the posts, a resilient bracket having a portion attached to a side of the post and curved to lie between the post and rail and a free end extended towards the post, reinforcing blocks connected to adjacent ends of the rails and each having a convex face extending the length of a block and converging towards the opposite face of the block, the rails being shaped about said blocks to form pockets for the blocks conforming to the contour of the blocks, with the convex faces of the blocks providing prolonged convex bearings for ends of the rails between the blocks, and means securing said blocks and ends of the rails to said inwardly extending free end of the bracket.

3. A road guard for highways comprising supporting posts, sheet metal rails supported by the posts, a resilient bracket connecting the rails to a post, the ends of the bracket being deflected outwardly obliquely to the longitudinal axis of the rails, reinforcing blocks connected to adjacent ends of the rails and each having a convex face extending the length of a block and converging towards the opposite face of the block, the rails being shaped about said blocks to form pockets for the blocks conforming to the contour of the blocks, with the convex faces of the blocks providing prolonged convex bearings for ends of the rails between the blocks, and means securing said blocks and ends of the rails to the bracket.

4. A road guard for highways comprising supporting posts, sheet metal rails supported by the posts, said rails having adjacent ends of rail sections deflected substantially at right angles to the longitudinal plane of the sections, reinforcing blocks applied to the deflected portions of the rail sections, bolts passed through said deflected portions and through the reinforcing blocks, and springs applied to the bolts to exert tension on the rails to compensate for variations in tension due to atmospheric conditions.

5. A road guard for highways comprising supporting posts, sheet metal rails supported by the posts, the end of a rail next to an end post being projected angularly to the longitudinal plane of the rail, a reinforcing block applied to said angularly projected portion and formed with a convex face extending lengthwise of the block and the block converging towards its opposite face, the angularly projected end portion of the rail being shaped about the block to conform to the contour of the block, an angle-plate applied between the end of the rail and the end post, bolts passed through the end post, the reinforcing block and the deflected end of the rail, nuts applied to the bolts between the end of the rail and said angle-plate and serving as an abutment, and nuts applied to the ends of the bolts for tensioning the rail.

ROBERT J. WOODS, Jr.